United States Patent
Niewels

(10) Patent No.: US 7,293,981 B2
(45) Date of Patent: Nov. 13, 2007

(54) APPARATUS FOR INJECTION MOLDING USING ACTIVE MATERIAL ELEMENTS

(75) Inventor: Joachim Johannes Niewels, Thornton (CA)

(73) Assignee: Husky Injection Molding Systems Ltd. (CA)

( * ) Notice: Subject to any disclaimer, the term of this patent is extended or adjusted under 35 U.S.C. 154(b) by 707 days.

(21) Appl. No.: 10/830,436

(22) Filed: Apr. 23, 2004

(65) Prior Publication Data

US 2005/0236740 A1 Oct. 27, 2005

(51) Int. Cl.
*B29C 45/66* (2006.01)
(52) U.S. Cl. .................................... 425/555; 264/328.7
(58) Field of Classification Search ............... 425/555, 425/589, 590; 264/328.7
See application file for complete search history.

(56) References Cited

U.S. PATENT DOCUMENTS

| | | | |
|---|---|---|---|
| 3,156,014 A * | 11/1964 | Wenger | 425/589 |
| 4,420,454 A | 12/1983 | Kawaguchi et al. | |
| 4,469,649 A | 9/1984 | Ibar | |
| 4,489,771 A | 12/1984 | Takeshima et al. | |
| 4,556,377 A | 12/1985 | Brown | |
| 4,588,367 A | 5/1986 | Schad | |
| 4,660,801 A | 4/1987 | Schad | |
| 4,828,769 A | 5/1989 | Maus et al. | |
| 4,867,672 A * | 9/1989 | Sorensen | 425/577 |
| 4,995,445 A | 2/1991 | Shigyo | |
| 5,192,555 A | 3/1993 | Arnott | |
| 5,237,238 A | 8/1993 | Berghaus et al. | |
| 5,238,389 A | 8/1993 | Brandau et al. | |
| 5,397,230 A | 3/1995 | Brew | |
| 5,439,371 A | 8/1995 | Sawaya | |
| 5,512,221 A | 4/1996 | Maus et al. | |
| 5,683,730 A | 11/1997 | Katsumata et al. | |
| 5,853,776 A | 12/1998 | Meijer | |
| 5,948,327 A | 9/1999 | Saito et al. | |

(Continued)

FOREIGN PATENT DOCUMENTS

EP 0 448 855 A1 10/1991

(Continued)

OTHER PUBLICATIONS

Patent Abstracts of Japan for JP 2003-094499, published on Apr. 3, 2003.

(Continued)

*Primary Examiner*—Tim Heitbrink
(74) *Attorney, Agent, or Firm*—Katten Muchin Rosenman LLP

(57) ABSTRACT

Method and apparatus for compressing melt and/or compensating for melt shrinkage in an injection mold are provided. The apparatus includes a cavity mold portion adjacent a cavity plate, a core mold portion adjacent a core plate, a mold cavity formed between the mold portions, and at least one piezoceramic actuator disposed between either or both of the core plate and the core mold portion and the cavity plate and the cavity mold portion. A controller may be connected to the at least one piezoceramic actuator to activate it, thereby causing the mold cavity volume to decrease, compressing the melt.

9 Claims, 4 Drawing Sheets

U.S. PATENT DOCUMENTS

| | | |
|---|---|---|
| 6,203,747 B1 | 3/2001 | Grunitz |
| 6,289,259 B1 | 9/2001 | Choi et al. |
| 6,343,925 B1 | 2/2002 | Jenko |
| 6,629,831 B2 | 10/2003 | Wei et al. |
| 6,705,725 B2 | 3/2004 | Gotoh et al. |
| 2006/0033228 A1* | 2/2006 | Hoogland .................... 264/68 |

FOREIGN PATENT DOCUMENTS

| | | |
|---|---|---|
| JP | 63-197623 | 8/1988 |
| JP | 2003-094499 | 4/2003 |

OTHER PUBLICATIONS

Patent Abstracts of Japan for JP 63-197623, published on Aug. 16, 1988.

marco: Structure and characteristics of piezokeramisher pile actuators [online], marco Systemanalyse und Entwicklung GmbH, Sep. 16, 2003 Translated Version (from German to English by Yahoo translation tool) [retrieved on Oct. 13, 2004] < URL http://www.marco.de./E/D/pa/017.html>.

Piezo Square Stack Actuators: pss . . . [online], marco Systemanalyse und Entwicklung GmbH, Jan. 19, 2004, [retrieved on Oct. 13, 2004], <URL http://www.marco.de/E/D/pss/001.html>.

Piezoceramic Stack Actuators: pa/ps [online], marco Systemanalyse und Entwicklung GmbH, Feb. 17, 2004, [retrieved on Oct. 13, 2004], <URL http://www.marco.de/E/D/pa/ps/007.html>.

MIDE: Active Materials [online] Mide Teccnology Corporation, [retrieved on Oct. 13, 2004] < http://www.mide.com/active_materials.html>.

William J. Tobin, "Venting from the Inside", Plastics, Machinery & Equipment, Feb. 1990, p. 55.

* cited by examiner

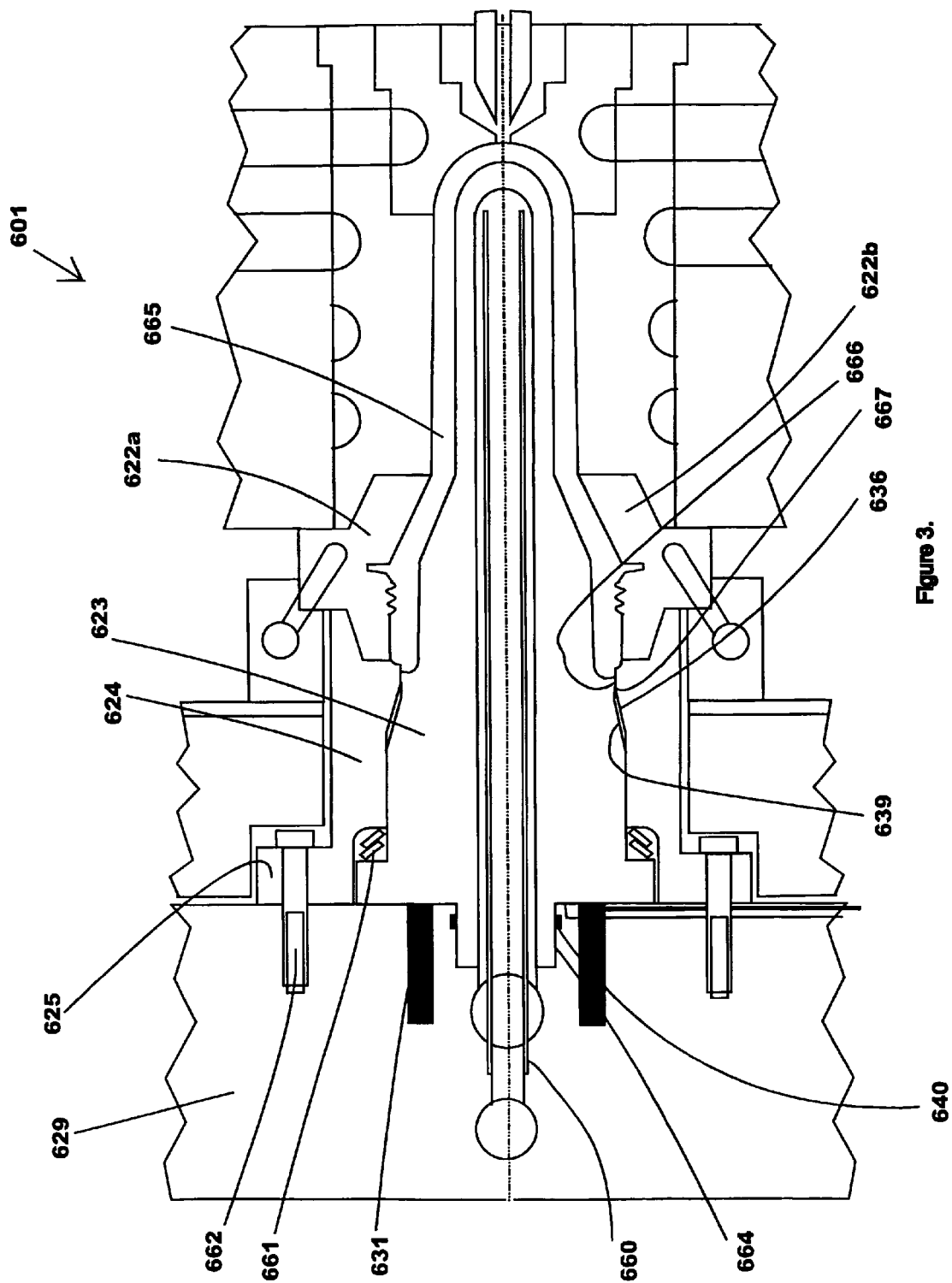

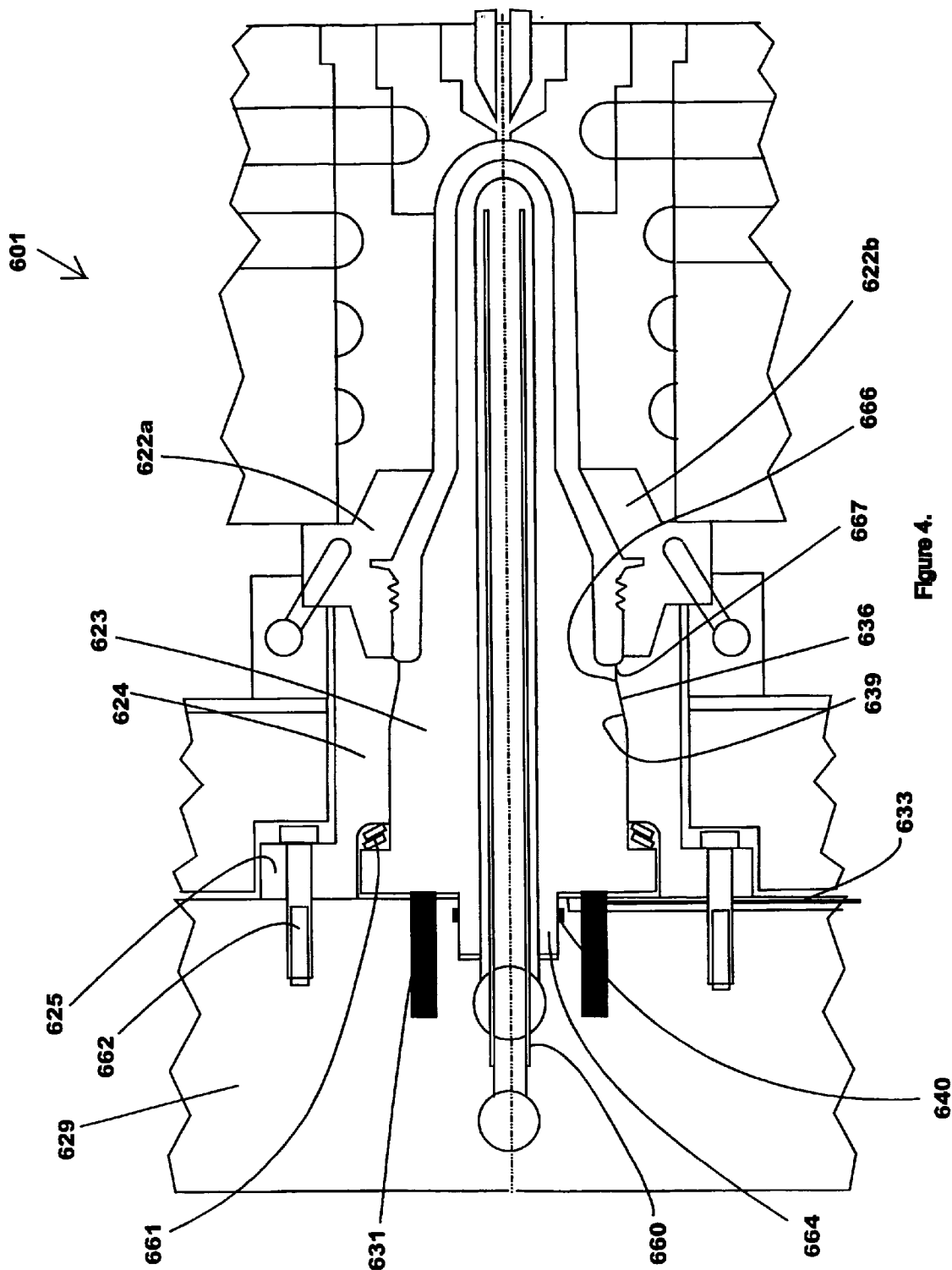

APPARATUS FOR INJECTION MOLDING USING ACTIVE MATERIAL ELEMENTS

BACKGROUND OF THE INVENTION

1. Field of the Invention

The present invention relates to a method and apparatus in which active material elements are used in injection molding machine equipment (e.g., insert stacks or hot runner nozzle assemblies), in order to provide compression of melt inside a mold cavity, thereby improving the quality of the molded article, including its surface finish and dimensional accuracy, and compensating for plastic shrinkage. "Active materials" are a family of shape altering materials such as piezoceramics, electrostrictors, magnetostrictors, shape memory alloys and the like. In the present invention, they can also be used as sensors.

2. Related Art

Active materials are characterized as transducers that can convert one form of energy to another. For example, a piezo actuator (or motor) converts input electrical energy to mechanical energy causing a dimensional change in the element, whereas a piezo sensor (or generator) converts mechanical energy—a change in the dimensional shape of the element—into electrical energy. One example of a piezoceramic transducer is shown in U.S. Pat. No. 5,237,238 to Berghaus. One supplier of piezo actuators is Marco Systemanalyse und Entwicklung GmbH, Hans-Böckler-Str. 2, D-85221 Dachau, Germany, and their advertising literature and website illustrate such devices. Typically an application of 1,000 volt potential to a piezoceramic insert will cause it to "grow" approximately 0.0015"/inch (0.15%) in thickness. Another supplier, Midé Technology Corporation of Medford, Me., has a variety of active materials including magnetostrictors and shape memory alloys, and their advertising literature and website illustrate such devices, including material specifications and other published details.

Injection compression molding is used in many applications to improve the properties of the article being molded. U.S. Pat. No. 4,828,769 to Maus discloses such an application for molding Compact Discs. U.S. Pat. No. 4,420,454 to Kawaguchi discloses such an application for the molding of a plastic can. Typically, hydraulically actuated cylinders or mechanical actuators are used to induce the final clamping action used to achieve product compression in these examples.

Thus, what is needed is a new technology capable of compression molding that provides a level of adjustable control, and preferably provides embedded sensors and closed loop control of the compression molding process.

SUMMARY OF THE INVENTION

It is an advantage of the present invention to provide injection molding machine apparatus and method to overcome the problems noted above, and to provide an effective, efficient means for performing compression molding in an injection molding machine.

According to a first aspect of the present invention, structure and/or steps are provided for compressing melt within a injection mold cavity, including the steps of filling the injection mold with melt; and activating at least one active material element in the mold to force at least one movable mold surface in the mold away from at least one fixed surface in the mold, thereby compressing the melt.

According to a second aspect of the present invention, structure and/or steps are provided for an apparatus for compressing melt in an injection mold cavity, including at least one stable surface within the injection mold; at least one movable surface within the injection mold; at least one active material element affixed to each stable surface, and adjacent to each movable surface, the active material connectable to a control means for energizing the at least one active material element to move the movable surface away from the stable surface, thereby reducing the size of the injection mold cavity and compressing the melt.

According to a third aspect of the present invention, structure and/or steps are provided for compensating for melt shrinkage within an injection mold, including the step of communicating with the at least one active material element using the controller to expand a mold cavity between the core insert and the cavity insert during filling.

BRIEF DESCRIPTION OF THE DRAWINGS

Exemplary embodiments of the presently preferred features of the present invention will now be described with reference to the accompanying drawings in which:

FIG. 3 depicts a core lock style preform molding stack incorporating the present invention in the rearward or mold filling position; and FIG. 4 depicts a core lock style preform molding stack incorporating the present invention in the forward or compressing position.

DETAILED DESCRIPTION OF THE PRESENTLY PREFERRED EXEMPLARY EMBODIMENTS

1. Introduction

Figure 1:
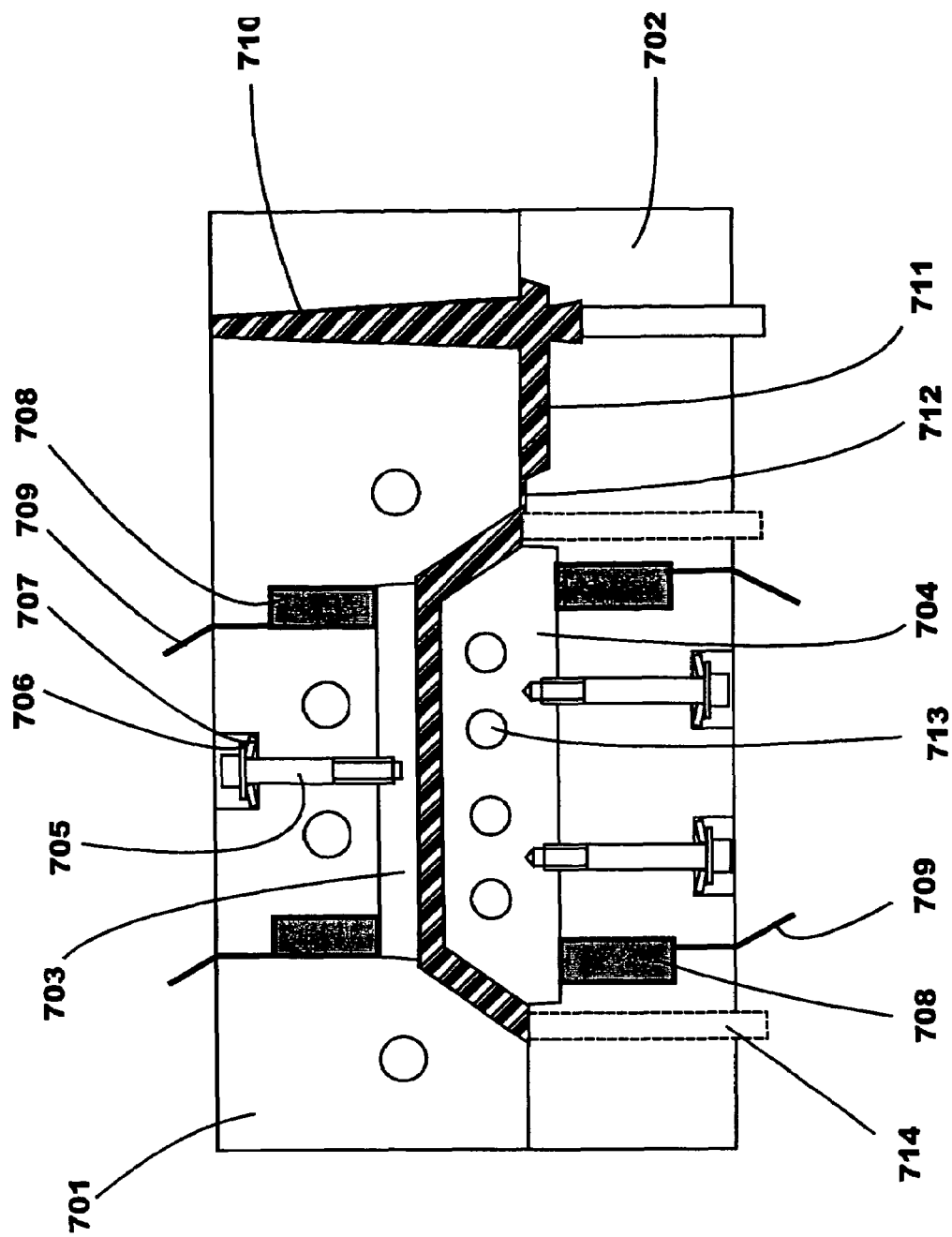
FIG. 1 depicts a mold stack incorporating the present invention.

The present invention will now be described with respect too several embodiments in which a plastic injection-molding machine for PET preforms is supplied with one or more active material elements which serve to cause compression of melt inside an injection mold cavity. However, the active material sensors and/or actuators may be placed in any location in the injection molding apparatus. Other applications for such active material elements are discussed in the following related applications: (1) U.S. patent application Ser. No. 10/830,434, filed concurrently on Apr. 23, 2004, entitled "Method and Apparatus for Countering Mold Deflection and Misalignment Using Active Material Elements", (2) U.S. patent application Ser. No. 10/830,403, filed concurrently on Apr. 23, 2004, entitled "Method and Apparatus for Adjustable Hot Runner Assembly Seals and Tip Height Using Active Material Elements", now U.S. Pat. No. 7,165,958 (3) U.S. patent application Ser. No. 10/830,435, filed concurrently on Apr. 23, 2004, entitled "Method and Apparatus for Assisting Ejection from an Injection Molding Machine using Active Material Elements", (4) U.S. patent application Ser. No. 10/830,438, filed concurrently on Apr. 23, 2004, entitled "Method and Apparatus for Controlling a Vent Gap with Active Material Elements", (5) U.S. patent application Ser. No. 10/830,485, filed concurrently on Apr. 23, 2004, entitled "Method and Apparatus for Mold Component Locking Using Active Material Elements", (6) U.S. patent application Ser. No. 10/830,488, filed concurrently on Apr. 23, 2004, entitled "Method and Apparatus for Vibrating Melt in an Injection Molding Machine Using Active Material Elements", and (7) U.S. patent application Ser. No. 10/830,437, filed concurrently on Apr. 23, 2004, entitled "Control System for Utilizing Active Material Elements in a Molding System" now U.S. Pat. No. 7,072,735.

As discussed above, there is a need in the art for methods and apparatus for using active material elements to actuate a mold portion, such as a core, to cause compression of the melt inside the mold cavity. In the following description, piezoceramic inserts are described as the preferred active material. However, other materials from the active material family, such as magnetostrictors and shape memory alloys could also be used in accordance with the present invention. A list of possible alternate active materials and their characteristics is set forth below in Table 1, and any of these active materials could be used in accordance with the present invention:

TABLE 1

Comparison of Active Materials

| Material | Temperature Range (° C.) | Nonlinearity (Hysteresis) | Structural Integrity | Cost/Vol. ($/cm3) | Technical Maturity |
|---|---|---|---|---|---|
| Piezoceramic PZT-5A | −50-250 | 10% | Brittle Ceramic | 200 | Commercial |
| Piezo-single crystal TRS-A | — | <10% | Brittle Ceramic | 32000 | Research |
| Electrostrictor PMN | 0-40 | Quadratic <1% | Brittle Ceramic | 800 | Commercial |
| Magnetostrictor Terfenol-D | −20-100 | 2% | Brittle | 400 | Research |
| Shape Memory Alloy Nitinol | Temp. Controlled | High | OK | 2 | Commercial |
| Magn. Activated SMA NiMnGa | <40 | High | OK | 200 | Preliminary Research |
| Piezopolymer PVDF | −70-135 | >10% | Good | 15* | Commercial |

(information derived from www.mide.com)

2. The Structure of the First Embodiment

Figure 2:
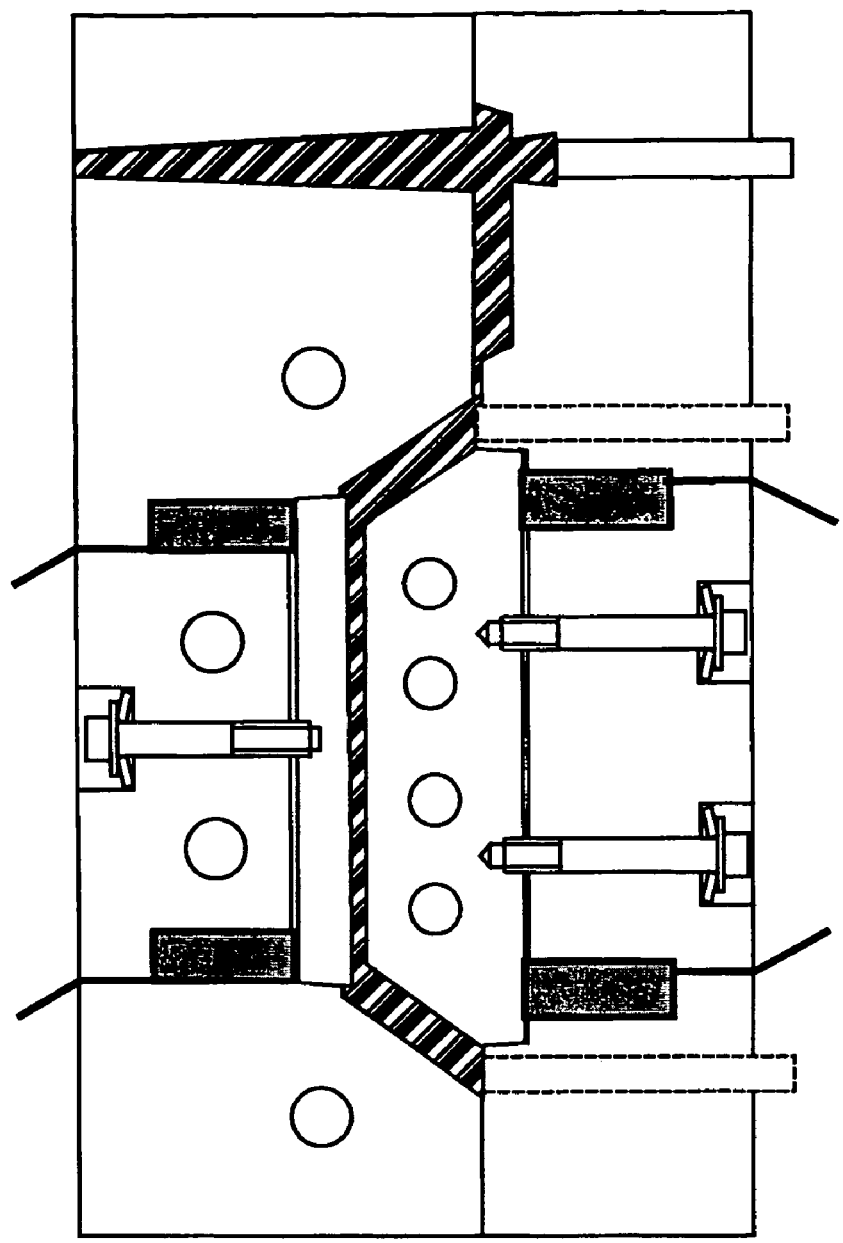
FIG. 2 depicts a mold stack incorporating the present invention in the forward or compressing position.

The first preferred embodiment of the present invention is shown in FIGS. 1 and 2, which depicts a cold runner edge gated mold stack comprising a cavity block 701 and a core block 702, a movable cavity insert 703 and a movable core insert 704. The movable inserts are retained by bolts 705, fitted with washers 706, and spring washers 707, such that the spring washers 707 constantly urge the insert toward its respective recess cutout in its respective block.

The movable cavity insert 703 and movable core insert 704 may be provided with piezoceramic devices 708 such that either or both of the inserts 703, 704 may be actuated to cause compression of the melt within the mold cavity. The piezoceramic devices 708 are connected to a controller (not shown) by conduits 709.

The movable cavity and core inserts 703 and 704 are moved by energizing piezoceramic devices 708, or the like, to cause the inserts to move away from the piezoceramic devices 708 and toward the mold cavity, thereby reducing the wall thickness of the part being molded adjacent the cavity and/or core insert being moved. The piezoceramic devices 708 are connected to a controller, not shown, via conduits 709 and can be energized so as to cause compression of the molten resin. Such compression during and/or immediately after the injection of the resin into the cavity causes the finished molded part to have improved mechanical properties.

The plastic is injected into the cavity via sprue 710, runner 711 and gate 712. Cooling channels 713 in the blocks and inserts cool the plastic so that it quickly solidifies into the molded shape. Ejector pins 714 are actuated after the mold has opened to cause the molded part to be ejected off the core in conventional manner. An alternative embodiment is to use only one movable insert in one half of the molding stack. A single insert may be sufficient to induce satisfactory compression of the melt in the mold cavity. Use of a single insert system reduces the cost of the installation of the means for compressing the melt in the mold.

According to the presently preferred embodiment of the present invention, an active material (e.g., piezoceramic) inserts 708 are located between the cavity block 701 and the movable cavity insert 703, and between the core block 702 and the movable core insert 704. The active material inserts 708 are preferably actuators driven by a controller (not shown) through wiring conduits 709, although wireless methods of control are also possible. It is also envisioned that the inserts 708 may be positioned in other locations within the mold assembly, so long as the location allows the actuation of the element to result in the injection mold components to be moved in a way that induces compression of the molten resin contained in the mold. For example, actuators may also be located at interfaces between the cavity block 701 and the core block 702, of a single actuator may be used instead of several actuators, as an alternative or in addition to the configuration shown in FIG. 1.

Piezoceramic inserts 708 are preferably single actuators that are rectangular in shape. According to a presently preferred embodiment, the actuator is about 30.0 mm thick and can be as long as required. It increases in thickness by approximately 50 microns when a voltage of 1000 V is applied via conduits 709. However, use of multiple actuators and/or actuators having other shapes are contemplated as being within the scope of the invention, and the invention is therefore not to be limited to any particular configuration of the insert 708.

Preferably, one or more separate piezoceramic sensors may be provided adjacent the actuator 708 (or between any of the relevant surfaces described above) to detect pressure caused by presence of melt between the movable cavity insert 703 and the movable core insert 704, and/or to detect the degree of compression being imparted to the melt by the actuation of elements 708. Preferably, the sensors provide sense signals to the controller (not shown). The piezoelectric elements used in accordance with the preferred embodiments of the present invention (i.e., the piezo-electric sensors and/or piezo-electric actuators) may comprise any of the devices manufactured by Marco Systemanalyse und Entwicklung GmbH. The piezo-electric sensor detects pressure and/or compression applied to the melt using element 708 and transmits a corresponding sense signal through the wiring connections 709, thereby allowing the controller to effect closed loop feedback control. The piezo-electric actuator 708 will receive an actuation signal through the wiring connections 709, change dimensions in accordance with the actuation signal, and apply a corresponding force between the cavity block 701 and the movable cavity insert 703, and between the core block 702 and the movable core insert 704, thereby adjustably controlling the degree of compression imparted to the melt disposed between the movable cavity insert 703 and the movable core insert 704.

Note that the piezo-electric sensors may be provided to sense pressure at any desired position. Likewise, more than one piezo-electric actuator may be provided to form element 708, mounted serially or in tandem, in order to effect extended movement, angular movement, etc. Further, each piezo-electric actuator may be segmented into one or more arcuate, trapezoidal, rectangular, etc., shapes which may be separately controlled to provide varying forces at various locations between the surfaces. Additionally, piezo-electric actuators and/or actuator segments may be stacked in two or more layers to effect fine compression control, as may be desired.

The wiring conduits 709 are coupled to any desirable form of controller or processing circuitry for reading the piezo-electric sensor signals and/or providing the actuating signals to the piezo-electric actuators. For example, one or more general-purpose computers, Application Specific Integrated Circuits (ASICs), Digital Signal Processors (DSPs), gate arrays, analog circuits, dedicated digital and/or analog processors, hard-wired circuits, etc., may control or sense the piezo-electric element 31 described herein. Instructions for controlling the one or more processors may be stored in any desirable computer-readable medium and/or data structure, such floppy diskettes, hard drives, CD-ROMs, RAMs, EEPROMs, magnetic media, optical media, magneto-optical media, etc.

Use of the element 708 according to the present embodiment also allows the various components of the injection mold assembly described above to be manufactured to lower tolerance, thereby decreasing the cost of manufacturing the injection molding machine components themselves. Further benefits include the ability to adjust the amount of compression of the melt contained within the mold more efficiently, thereby improving the quality of the molded articles being produced.

3. The Process of the First Embodiment

In operation, the resin is injected via the sprue 710, runner 711, and gate 712 to fill the cavity. The piezoceramic devices 708 are energized via conduits 709 to move towards each other, thereby reducing the wall thickness of the plastic between them. FIG. 2 shows the piezoceramic devices 708 in this energized or actuated position, and the reduced wall thickness panel so formed. A single insert acting from one side of the mold cavity could also be used according to an alternative embodiment to compress the melt and form a thinner walled section in the part at a lower equipment cost and in some applications this alternative embodiment is preferred. After the part has solidified, the mold has been opened, and the part has been ejected, the piezoceramic devices 708 are de-energized and return to their former (retracted) positions for the next cycle. This technique may be used in applications where the wall thickness of the part is required to be thinner than can be injection molded conventionally, or to form a locally stress free panel, etc.

When the piezo-electric element 708 is used with a closed loop control configuration, the sensor element generates a signal in response to pressure and/or compression between the movable cavity plate 703 and the movable core plate 704, and transmits the signal via conduit 709 to the controller (not shown). Based on the signals received from the sensor, the controller then generates appropriate actuation signals that are transmitted via conduit 709 to the actuator element 708, energizing it in accordance with the data received from the sensor to accomplish proper compression of the melt contained between the movable cavity plate 703 and the movable core plate 704. For example, the controller may be programmed to cause the compression forces to remain constant, or to increase and/or decrease the compression according to a predetermined schedule, based on time, temperature, and/or number of cycles.

4. The Structure of the Second Embodiment

With reference to a second preferred embodiment of the present invention, FIGS. 3 and 4 depict a preform molding stack 601 that includes a core half that comprises a pair of neck rings 622a and 622b, lock ring 624, core 623, core cooling tube 660, core seal 640, core piezoceramic actuation sleeve 631, power supply connection 633, core spring set 661, and lock ring bolts 662. Lock ring 624 has a flange 625 through which bolts 662 fasten the lock ring to the core plate 629. Core 623 is located in the core plate 629 by spigot 664 and is urged against the core plate 629 by spring set 661 that includes one or more Belleville type spring washers.

Piezoceramic actuation sleeve 631 is positioned in the core plate, and when actuated, exerts a force against the base of the core 623 urging it away from the core plate 629, thereby compressing spring set 661. The core has a tapered alignment surface 639 that contacts complementary surface 663 on the inner surface of lock ring 624 such that, when actuated, the core is held forward against said taper as shown in FIG. 4. Piezoceramic actuation sleeve 631 provides sufficient force holding the core 623 in this position to ensure core stability and alignment during the curing phase of the molding cycle. Piezoceramic insert 631 is preferably annular and/or tubular in shape. According to a presently preferred embodiment, the actuator is about 30.0 mm long and 25.0 mm in diameter, and increases in length by approximately 50 microns when a voltage of 1000 V is applied via conduits 633.

The core also has a cylindrical portion 666 that contacts a complementary cylindrical portion 667 on the lock ring 623 to effect a sliding seal, thereby preventing the molding material leaking through this cylindrical interface between surfaces 666 and 667 while permitting relative axial motion between the two surfaces.

Optionally, one or more separate piezoceramic sensors may be provided to detect pressure and/or compression caused by melt disposed between the core 623 and the cavity 665. These sensors may also be connected by conduits 633 to a controller. The piezo-electric elements used in accordance with the present invention (i.e., the piezo-electric sensors and/or piezo-electric actuators) may comprise any of the devices manufactured by Marco Systemanalyse und Entwicklung GmbH. The piezo-electric sensors can detect the pressure/compression in the melt that is contained between the core 623 and the cavity 665 and transmit a corresponding sense signal through the conduits 633, thereby effecting closed loop feedback control. The piezo-electric actuators then receive actuation signals through the conduits 633, and apply corresponding forces. Note that piezo-electric sensors may be provided to sense pressure and/or compression from any desired position. Likewise, more than one piezo-electric actuator may be provided in place of any single actuator described herein, and the actuators may be mounted serially or in tandem, in order to effect extended movement, angular movement, etc.

As mentioned above, one of the significant advantages of using the above-described active element inserts is to allow the manufacturing tolerances used for the components of the injection mold to be widened, thereby significantly reducing the cost of machining them. Another advantage of using piezoceramic inserts in the configurations described above is that they provide improved compression to the melt, resulting in higher quality molded articles, without requiring bulky or expensive compression apparatus.

5. The Process of the Second Embodiment

Similar to the process of the first embodiment, in operation, the core 623 is held in the rearward position as shown in FIG. 3 by deactivating the piezoceramic actuation sleeve 631 and allowing the spring set 661 to hold the core 623 against the core plate. Cylindrical complementary surfaces 666 and 667 prevent the incoming resin from leaking at their interface. Either during the filling time or immediately after the mold cavity has been filled the piezoceramic actuation sleeve 631 is actuated to urge the core 623 forward and compress the melt in the mold cavity. The core is aligned by the complementary tapered surfaces 636 and 639 to ensure that in its final forward position it is centered and aligned in the desired position to cause the molded article being formed to have the required dimensional configuration. After the part has cooled sufficiently the mold is opened and the part is ejected conventionally.

An alternate operation is to use the piezoceramic actuation sleeve 631 to advance a mold core insert during the cooling portion of the molding cycle to cause a local portion of a molded article to have a thinner wall section. One such application could be in the production of "smart cards" in which a local depression is formed in the plastic card to accommodate an electronic chip housed therein.

In an alternate embodiment, piezoceramic elements acting as sensors (not shown) are used in combination with the actuating elements to provide a closed loop feedback configuration, as described above. The sensor elements generate signals in response to pressure and/or compression of the melt present between the core 623 and the cavity 665, and transmit the signals via power supply connections 633 to a controller. Based on the signals received from the sensors, the controllers then generate other signals that are transmitted via connections 633 to the actuators, energizing them in accordance with the data received from the sensors to accomplish effective compression of the melt contained within the mold.

Utilizing injection compression in the molding of preforms can compensate for plastic shrinkage, thereby shortening the molding cycle since the mold gate need not be held open for additional material to be supplied to make up for the shrinkage amount within the mold cavity. The additional volume provided by holding the core in the retracted position during filling provides this "shrinkage compensation" amount, thereby allowing the gate to be closed earlier in the cycle. A second advantage is that the top sealing surface (TSS) of the preform is formed by compressing melt as the core advances, thereby improving the surface finish quality and dimensional accuracy of this critical feature in preforms.

6. Conclusion

Thus, what has been described is a method and apparatus for using active material elements in an injecting molding machine, separately and in combination, to effect useful improvements in injection molding apparatus for injection compression molding.

Advantageous features according the present invention include: 1. A piezo ceramic element used singly or in combination to move a molding core, thereby providing additional mold cavity volume for filling that can be used to compensate for shrinkage; 2. Use of a closed loop controlled force generating unit to provide an injection compression molding process within the mold cavity; 3. Use of local force generating units to cause a core insert to advance and provide a locally-formed wall section thinner than surrounding wall sections in a finished molded article; and 4. Dynamic adjustment of wall section thickness using a local force-generating unit.

While the present invention provides distinct advantages for injection-molded PET plastic preforms generally having circular cross-sectional shapes perpendicular to the preform axis, those skilled in the art will realize the invention is equally applicable to other molded products, possibly with non-circular cross-sectional shapes, such as, pails, paint cans, tote boxes, and other similar products. All such molded products come within the scope of the appended claims.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents discussed above (and particularly the applications discussed above in paragraph [0014]) are hereby incorporated by reference into the Detailed Description of the Preferred Embodiment.

What is claimed is:

1. Apparatus for compressing melt in an injection mold cavity, comprising:

at least one stable surface within said injection mold;

at least one movable surface within said injection mold;

at least one active material element affixed to each stable surface, and adjacent to each movable surface, said active material connectable to a control means for energizing said at least one active material element to move said movable surface away from said stable surface, thereby reducing a size of said injection mold cavity and compressing said melt.

2. The apparatus of claim 1, wherein said at least one stable surface is a core plate, and said at least one movable surface is a mold core insert.

3. The apparatus of claim 1, wherein said at least one stable surface is a manifold plate, and said at least one movable surface is a mold cavity insert.

4. The apparatus of claim 1, wherein said at least one stable surface includes a core plate and a manifold plate and said at least one movable surface includes a mold core insert and a mold cavity insert.

5. The apparatus of claim 1, further including at least one sensor for detecting whether melt is present in said injection mold.

6. Apparatus for compression molding plastics, comprising:
- a cavity mold portion adjacent a cavity plate;
- a core mold portion adjacent a core plate;
- a mold cavity formed between said cavity mold portion and said core mold portion;
- at least one piezoceramic actuator disposed between one or both of (i) said core plate and said core mold portion, and (ii) said cavity plate and said cavity mold portion said actuator connectable to a controller.

7. The apparatus of claim 6, wherein said at least one piezoceramic actuator is disposed between said core plate and said core mold portion, and said controller actuates, in use, said piezoceramic actuator to compress said mold cavity.

8. The apparatus of claim 6, wherein said at least one piezoceramic actuator is disposed between said cavity plate and said cavity mold portion, and said controller actuates said piezoceramic actuator to reduce the volume of said mold cavity.

9. The apparatus of claim 6, wherein at least one piezoceramic actuator is disposed between said core plate and said core mold portion, and at least one piezoceramic actuator is disposed between said cavity plate and said cavity mold portion, and said controller actuates said piezoceramic actuators to reduce the mold cavity.

* * * * *